UNITED STATES PATENT OFFICE.

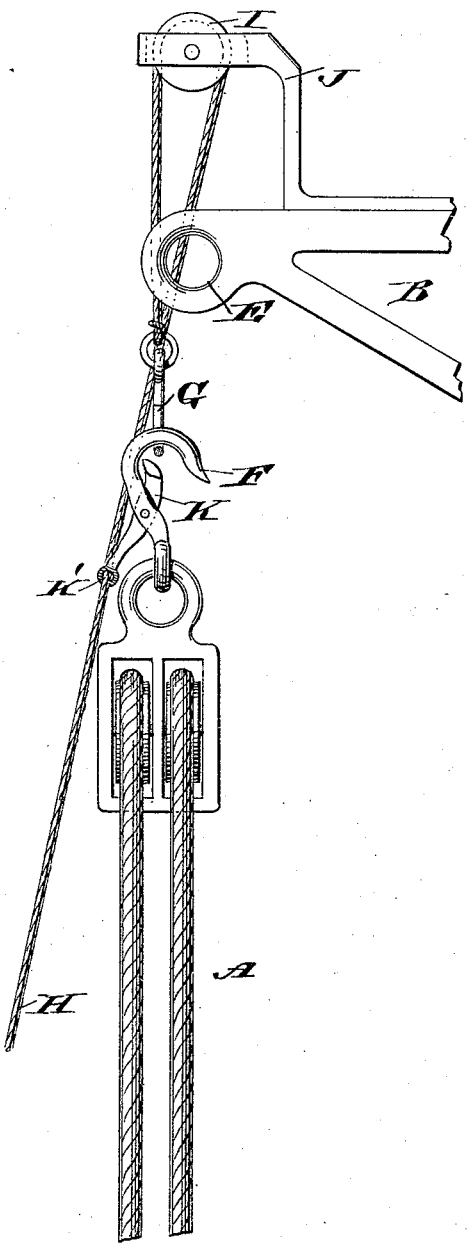

HENRY SELLHEIM, OF NEW YORK, N. Y.

HOISTING DEVICE AND SUPPORT.

SPECIFICATION forming part of Letters Patent No. 484,252, dated October 11, 1892.

Application filed May 5, 1892. Serial No. 431,930. (No model.)

*To all whom it may concern:*

Be it known that I, HENRY SELLHEIM, of the city, county, and State of New York, have invented a new and Improved Hoisting Device and Support, of which the following is a full, clear, and exact description.

The object of the invention is to provide a new and improved hoisting device and support for tackle and other apparatus, and which is simple and durable in construction, and more especially designed for use in warehouses and other buildings or on board of ships for conveniently hoisting a tackle or other apparatus to the proper place from the ground or deck, and to automatically engage the tackle on the support, so as to be suspended therefrom.

The invention consists of certain parts and details and combinations of the same, as will be hereinafter described, and then pointed out in the claim.

Reference is to be had to the accompanying drawing, forming a part of this specification, in which the improvement is shown in side elevation.

The device is more especially designed for raising or hoisting apparatus—such as a tackle A, for instance—to a support B, located on the front of a building or on a mast, so that the tackle is suspended from the support and is used for hoisting bales, merchandise, packages, machinery, and the like. As shown, the support B is formed at its free end with a ring or eye E, adapted to be engaged by a hook F, held on the upper pulley-block of the tackle A.

With my improved device the tackle A is raised from the ground so that the hook F engages the ring or eye E without the operator climbing up to the support, carrying the tackle with him and hanging it onto the support, the tackle then being suspended from the ring or eye E. My device is provided with a spring-hook G, adapted to engage the hook F, the said spring-hook being attached to one end of a rope H, passing over a pulley I, journaled in a bracket J, attached to the support B in such a manner that the said pulley I is located above the ring or eye E. The rope H after passing over the pulley I extends down to the ground and is manipulated by the operator standing on the ground. Now in order to raise and support the tackle A, the operator having both ends of the rope H on the ground, engages the spring-hook G, and then pulls on the other end of the rope, so as to hoist the tackle A by means of the rope H and the spring-hook G. The operator in pulling on the rope H finally brings the hook F into engagement with the eye E, thus suspending the tackle from the support B.

In order to enable the operator to conveniently manipulate the hook F so as to engage the eye E, the rope H is passed through a ring or eye K', formed on a lever K, pivoted to the shank of the hook F and adapted to close the free end of the latter, so as to prevent the disengagement of the spring-catch G at the time the rope H is slacked up.

It will be seen that in this device the tackle is hoisted by the rope H, and when the hook F is with its point above the opening in the eye E then the operator manipulates the rope H, so that the pointed end of the hook F points to the opening, and on slacking up the rope H the hook engages the eye E. It will be seen that as the rope H passes through an eye in the lever K the operator is enabled to conveniently change the position of the hook F, so as to properly engage the eye E of the support B. It will further be seen that the lever K when closing the pointed end of the hook F prevents the spring-catch G from accidentally disengaging the said hook F. It will thus be seen that by this apparatus the tackle or other device is raised to the support and moved automatically in engagement with the same, so as to be suspended from the support for use in hoisting other articles or for other purposes, as the case may require. In a like manner when the job of hoisting has been finished the tackle can be disengaged from its support and lowered again to the ground to be stored away in the usual manner until its use is again required for the purpose above mentioned.

Having thus fully described my invention, I claim as new and desire to secure by Letters Patent—

In a hoisting device, the combination, with a support provided with an eye and a pulley above the eye, of a tackle provided with a hook for engaging the eye of the support, a lever pivoted to the shank of the hook of the tackle and having an eye in one end, and a rope passed over the said pulley and provided at one end with a hook engaging the hook of the tackle, the other end of the rope being passed through the eye of the lever pivoted to the tackle-hook, substantially as herein shown and described.

HENRY SELLHEIM.

Witnesses:
 THEO. G. HOSTER,
 C. SEDGWICK.